United States Patent [19]

Egusa et al.

[11] 4,454,640
[45] Jun. 19, 1984

[54] METHOD OF PRODUCING BEARING DEVICES FOR DRIVING WHEELS OF AUTOMOBILES

[75] Inventors: Tomoyoshi Egusa, Iwata; Yutaka Miki, Kawanishi; Masayuki Kuroda, Takarazuka; Koshiro Fujimoto, Takatsuki; Motoharu Niki, Akaiwa, all of Japan

[73] Assignee: NTN Toyo Bearing Co., Ltd., Osaka, Japan

[21] Appl. No.: 420,250

[22] PCT Filed: Jan. 12, 1982

[86] PCT No.: PCT/JP82/00007
§ 371 Date: Sep. 13, 1982
§ 102(e) Date: Sep. 13, 1982

[87] PCT Pub. No.: WO83/02484
PCT Pub. Date: Jul. 21, 1983

[51] Int. Cl.³ .............................................. B21D 53/10
[52] U.S. Cl. ........................... 29/148.4 A; 29/149.5 R; 29/148.4 R
[58] Field of Search .......... 29/402.01, 402.08, 402.02, 29/402.03, 402.04, 402.05, 402.06, 402.07, 402.09, 402.11, 402.12, 402.14, 402.15, 402.17, 403.1, 403.3, 527.4, 148.4 A, 148.4 R, 149.5 R

[56] References Cited

U.S. PATENT DOCUMENTS

| | | | |
|---|---|---|---|
| 1,027,542 | 5/1912 | Hess | 29/148.4 A |
| 1,178,526 | 4/1916 | Laycock | 29/148.4 A |
| 3,192,002 | 6/1965 | Carter, Jr. | 29/148.4 A X |
| 3,824,658 | 7/1974 | Donahue et al. | 29/148.4 A |

Primary Examiner—Mark Rosenbaum
Assistant Examiner—V. K. Rising
Attorney, Agent, or Firm—Armstrong, Nikaido, Marmelstein & Kubovcik

[57] ABSTRACT

A method of manufacturing bearing assembly for the driven wheels of automobiles comprises the steps of grinding the outer peripheral raceway surface 5, cylindrical seat 6 and shoulder surface 9 of the outer joint member of a constant velocity joint simultaneously by a grinding wheel 21, grinding the outer peripheral raceway surface 11 of an inner annular member and its end surface abutting against the shoulder surface 9 simultaneously by a grinding wheel, and fitting the inner annular member C on the cylindrical seat 6 of the outer joint member B until its end surface 10 abuts against the shoulder surface 9 of the outer joint member B. The method eliminates the influences on the internal bearing clearance of the outer peripheral raceway surfaces 5 and 11 of the outer joint member B and inner annular member C.

3 Claims, 7 Drawing Figures

METHOD OF PRODUCING BEARING DEVICES FOR DRIVING WHEELS OF AUTOMOBILES

This invention relates to a method of producing bearing devices for driving wheels of automobiles.

In bearing devices for the driving wheels of automobiles with which the present invention is concerned, the outer periphery of the outer race of the outer joint member of a constant velocity universal joint serves as one of the inner members of the bearing. In such bearing devices, bearing clearance values have major influences on the life of the bearing and on the driving comfortableness of the automobile, so that severity is imposed on said bearing clearance values.

According to conventional methods of producing bearing devices for the driving wheels of automobiles, however, the grinding operation on the outer joint member and inner annular member is such that surfaces, such as the track surface, step section shoulder surface, step section cylindrical surface, and end surface contacting the step section shoulder surface, are separately ground by separate grinding stones within respective predetermined target tolerances. As a result, despite the fact that each surface is finished within its tolerance, the accumulation of variations results in a large range of clearance in the assembled bearings, with some bearings having a smaller clearance value than for the intended purpose of use and others a larger one. Thus, if bearings having a smaller clearance value than for the intended purpose of use are assembled into an automobile, this will result in seizure and premature peeling, decreasing the life of the bearing. Conversely, if the value of the bearing clearance is too large, this will result in rattling or vibration, which is undesirable. Further, since the grinding operation is not such that the corelation between the amounts of deviation of the finish dimension of the respective surfaces is constant, variations in the bearing clearance are produced, making it impossible to control clearances to bring them within a given range.

To eliminate the influence of the outer peripheral track surfaces of the outer joint member and inner annular member on the bearing clearance, the conventional production method may be effective to suppress the amount of variation by narrowing the tolerance, but narrowing the tolerance requires severe machining, which lowers productivity and increases the cost of production.

Therefore, in the conventional assembling operation, it has been necessary to prepare numbers of outer joint members and inner annular members in advance and select an outer joint member and an inner annular member as a pair which provides a given bearing clearance or negative bearing clearance each time a bearing is assembled, thus greatly detracting from bearing assembling efficiency and interchangeability.

In view of the above-described drawbacks to the conventional production method, the present invention provides a method of producing bearing devices for the driving wheels of automobiles which is intended to eliminate the influences of the outer peripheral track surfaces of the outer joint member and inner annular member on the bearing clearance.

To this end, the invention provides a method of producing bearing devices for the driving wheels of automobiles, which bearing devices comprise an outer member having two rows of track surfaces formed on the inner periphery thereof, the outer joint member of a constant velocity universal joint having one track surface formed on the outer periphery thereof, an inner annular member having the other track surface formed on the outer periphery thereof, and two rows of rolling bodies interposed between the track surfaces of said outer member, outer joint member, and inner annular member, said outer joint member being formed with a step section cylindrical surface for receiving said inner annular member thereon, said step section cylindrical surface having said inner annular member fitted thereon, with said inner annular member axially abutting against the shoulder surface of the step section, said method being characterised by the steps of grinding said track surface of the outer joint member, said step section cylindrical surface, and said step section shoulder surface simultaneously by a single grinding stone, while grinding said track surface of the inner annular member and its one end surface which abuts against the shoulder surface of the step section simultaneously by a single grinding stone, and fitting said inner annular member on the step section cylindrical surface of the outer joint member until it abuts against the step section shoulder surface of the outer joint member.

According to this invention, so long as outer joint members and inner annular members are finished within predetermined tolerances, outer joint members and inner annular members, which define peripheral track surfaces, can be combined together at random, and it is possible to eliminate the influences of the outer peripheral track surfaces on the bearing clearance in the assembled bearing, thus increasing bearing assembling efficiency. Further, since the step section cylindrical surface formed on the outer joint member for receiving the inner annular member thereon is ground simultaneously with the track surface and step section shoulder surface, there is no danger of misalignment between the two outer peripheral track surfaces. Further, in contrast to the conventional procedure in which the surfaces are separately ground, a plurality of surfaces are simultaneously ground, thus shortening the grinding time, increasing grinding efficiency, and enabling mass-production, thereby providing for the reduction of the cost of production.

In an embodiment of the invention, in grinding the outer peripheral track surface of the inner annular member and its end surface contacting the shoulder surface of the step section by a single grinding stone, the bore diameter of the inner annular member is measured by a gauge and the peripheral track surface of the inner annular member is finished on the basis of the result of the measurement. In another embodiment of the invention, in grinding the bore of the inner annular member by a grinding stone, the diameter of the outer peripheral track surface of the inner annular member is measured by a gauge and the diameter of the bore of the inner annular member is finished on the basis of the result of the measurement.

Therefore, according to the present invention, in grinding the outer peripheral track surface or bore of the inner annular member, the target finish dimension thereof is determined on the basis of the deviation of the finish dimension of the bore diameter or outer peripheral track surface of the inner annular member, so that variations of the diameter of the track surface due to the interference at the time of force-fitting it onto the step section cylindrical surface formed on the outer joint member (variations in diameter due to variations in the amount of expansion) can be eliminated, a fact which is suitable for random matching.

These and other objects and features of the invention will become more apparent from the following description to be given with reference to the accompanying drawings, in which.

Figure 1:
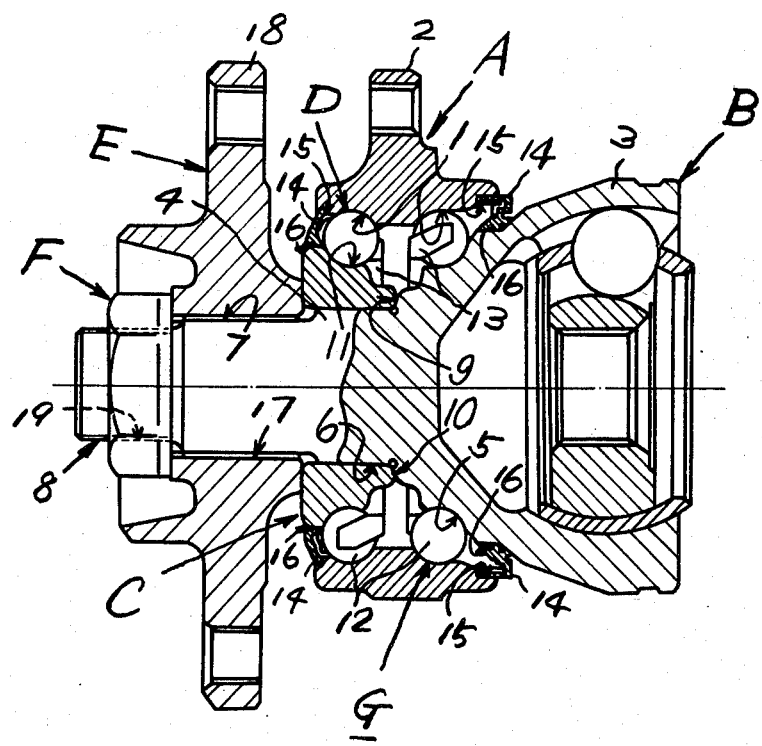
FIG. 1 is an explanatory view of a bearing device for the driving wheels of automobiles to which the production method of the invention is applied.

First, referring to FIG. 1 showing a bearing device for the driving wheels of automobiles to which the production method of the invention is applied, A denotes an outer joint member; B denotes the outer joint member of a constant velocity universal joint; C denotes an inner annular member; D denotes two rows of rolling bodies; E denotes a hub; and F denotes a nut member.

The outer member A is disposed around the outer periphery of the outer joint member B, has inner peripheral track surface 1 on the inner periphery thereof for supporting the two rows of rolling bodies B, and is integrally formed with a flange 2 for attachment to a vehicle.

The outer joint member B is integrally formed with an axially extending shaft portion 4 on the closed end of the outer race 3 of the constant velocity universal joint and is formed with an outer peripheral track surface 5 on its outer peripheral surface for supporting one row of rolling bodies D, a step section 6 on the outer peripheral surface thereof for force-fitting the inner annular member C thereon, and serrations or splines 7 for fitting the hub E thereon to allow transmission of power in the rotative direction, with a threaded portion 8 cut in the front end outer peripheral surface for threadedly receiving the nut member F thereon. The numeral 9 denotes a shoulder surface on the step section 6 formed in the boundary between the outer race 3 and the shaft portion 4, serving as an abutting surface associated with the end surface 10 of the inner annular member C for axial positioning of the latter.

The inner annular member C is formed on its outer periphery with an outer peripheral track surface 11 for supporting the other row of rolling bodies D, and is force-fitted on the cylindrical surface of the step section 6 of the outer joint member until the abutting end surface 10 abuts against the shoulder surface 9 of the step section 6 of the outer joint member so as to maintain fixed positional relation to the outer peripheral track surface 5 of the outer joint member.

The two rows of rolling bodies D are in the form of two rows of balls 12 held in retainers 13 between the inner peripheral track surfaces 1 of the outer member A and the outer peripheral track surfaces 5, 11 of the outer joint member B and inner annular member C, thereby forming a double-row angular ball bearing. The numeral 14 denotes seal members disposed between seal surfaces 15 formed on the inner periphery of the outer member A and seal surface 16 formed on the outer peripheries of the outer joint member B and inner annular member C, for sealing between the outer member A and the outer joint member B and inner annular member C.

The hub E is fitted on the shaft portion 4 of the outer joint member B and is formed on its inner periphery with a serrated or splined fitting portion 17 for engagement with the serrations or splines 7 formed on the shaft portion 4 and is integrally formed on its outer periphery with a flange for attachment to a wheel of a vehicle.

The nut member F has on its inner peripheral surface a threaded fitting portion 19 for threaded engagement with the threaded portion 8 of the front end of the outer joint member B. By threadedly fitting the threaded fitting portion 19 on the threaded portion 8 of the front end of the outer joint member B, the hub E and the bearing G are integrally joined to the outer joint member B and the bearing clearance and negative bearing clearance of the bearing G are determined.

In the bearing device of the construction described above for the driving wheels of automobiles, since the outer periphery of the outer race 3 of the outer joint member B serves as one of the inner members of the bearing G, the construction of the bearing G and parts associated with the bearing G is simplified and the entire bearing device is small in size and light in weight, making it possible to reduce the number of steps of assembling operation.

Figure 2:
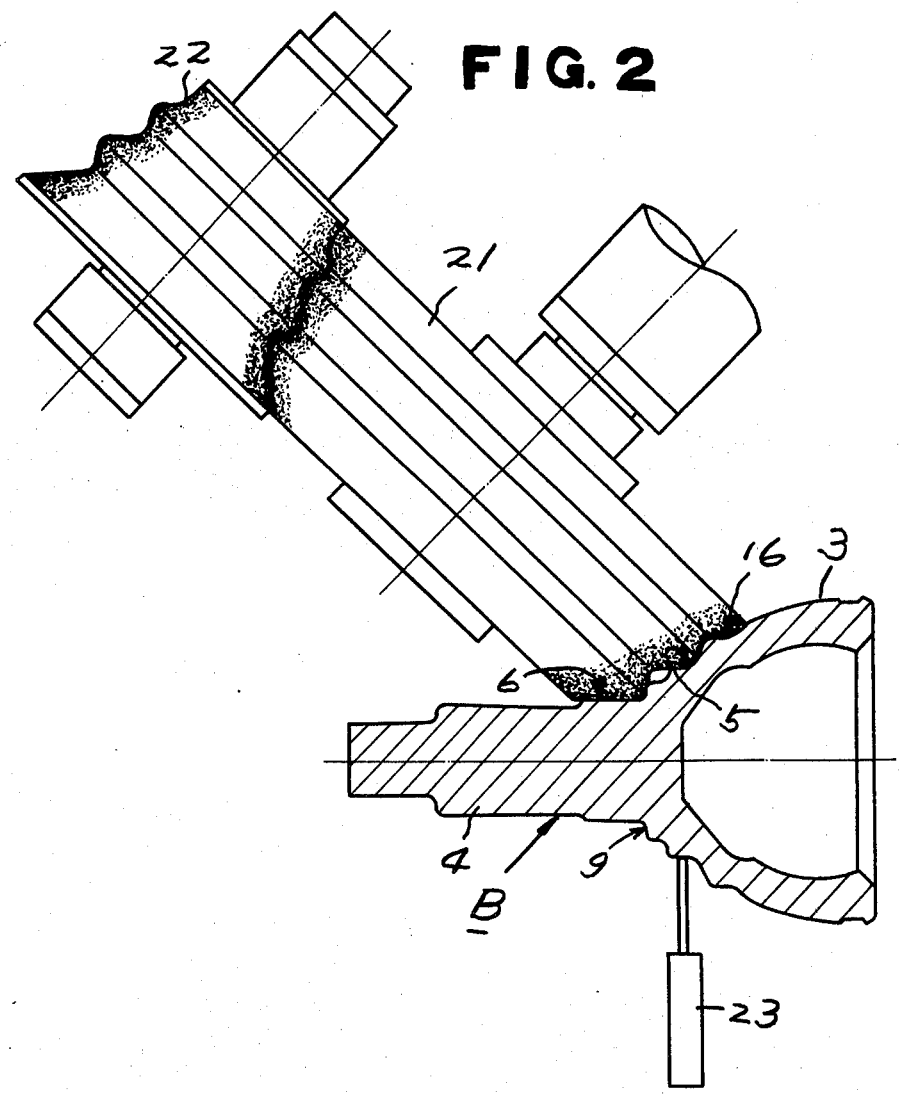
FIGS. 2 and 3 are diagrammatic views illustrating the manner of grinding an outer joint member and an inner annular member by the production method of the present invention.

Referring to FIG. 2 showing the manner of grinding the outer joint member B by the production method of the invention, 21 denotes an outer joint member grinding stone having a grinding surface of the same shape as the seal surface 16, track surface 5, step section shoulder surface 9 and step section (6) cylindrical surface of the outer joint member B; 22 denotes a formed diamond rotary dresser for correcting the grinding surface of said grinding stone 21; and 23 denotes an on-gauge 23 for in-process control of the grinding operation.

In operation, the outer joint member B is held by the plate (not shown) of a grinding machine and is rotated. While measuring the diameter of the track surface 5 of the outer joint member B by the on-gauge 23, the seal surface 16, track surface 5, step section shoulder surface 9 and step section (6) cylindrical surface of the outer joint member are simultaneously ground to the target dimensions.

With the track surface 5, step section shoulder surface 9 and step section (6) cylindrical surface of the outer joint member B thus ground, it follows that the axial dimensions of the step section shoulder surface 9 and track surface 5 and the diameter of the step section (b) cylindrical surface have been set in connection with the diameter of the track surface 5, and the dimensions of the track surface 5 and step section (6) cylindrical surface based on the step section shoulder surface 9 are maintained constant.

Figure 3:
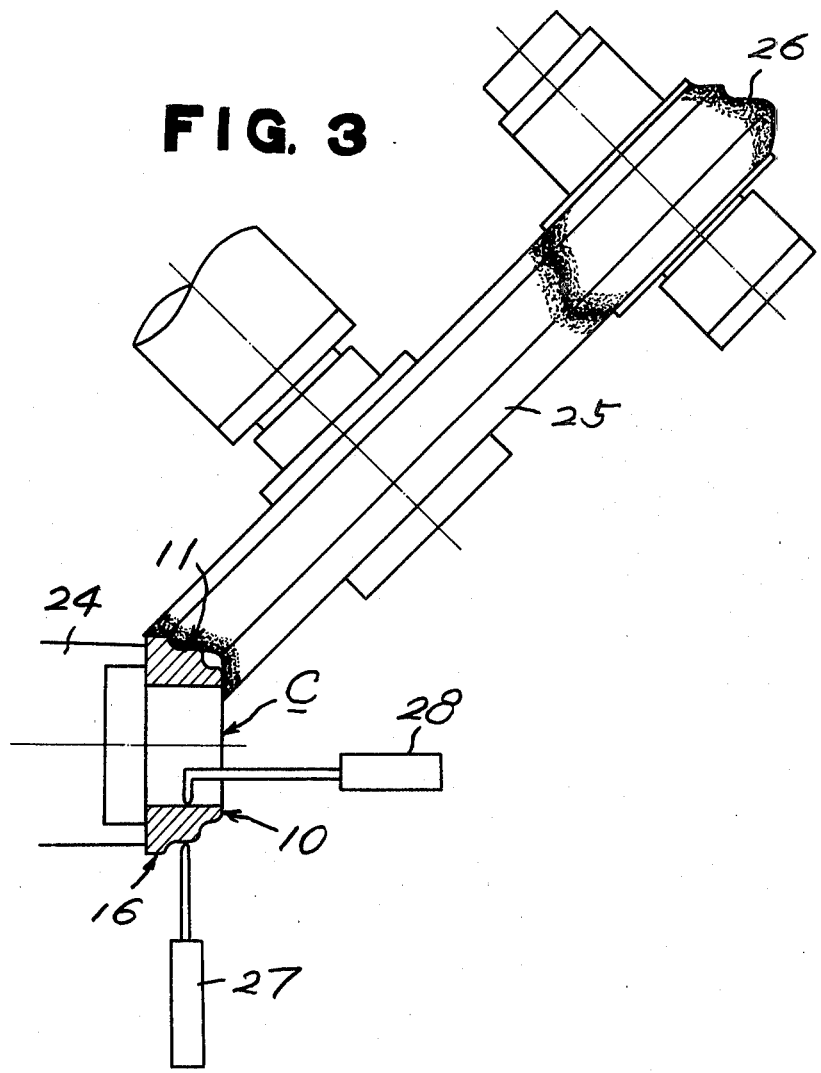

FIG. 3 shows the manner of grinding the inner annular member C. In this figure, 24 denotes the backing plate of a grinding machine for attracting and holding the end surface of the inner annular member C opposite to its abutting end surface 10; 25 denotes an inner annular member grinding stone having a grinding surface of the same shape as the seal surface 16, track surface 11 and abutting end surface 10 of the inner annular member C; 26 denotes a formed diamond rotary dresser for correcting the grinding surface of said grinding stone 25; 27 denotes an on-gauge for measuring the diameter of the track surface 11 of the inner annular member C for in-process control of the grinding operation; and 28 denotes a gauge for measuring the bore diameter of the inner annular member C.

In operation, the inner annular member C is held by the backing plate 24 of a grinding machine and, prior to machining, the bore diameter of the inner annular member C is measured by the gauge 28 to detect the amount of deviation of the finish dimension. The amount of variation in the expansion thereof due to said amount of deviation during force fitting onto the step section (6) cylindrical surface of the outer joint member B is calculated and a dimension corresponding to the result of this calculation is fed back to the on-gauge 27 to correct the target finish dimension of the track surface 11 of the inner annular member C. While the diameter of the track surface 11 of the inner annular member C is being measured by the on-gauge 27, the backing plate 24 and inner annular member C are rotated to simultaneously grind the seal surface 16, track surface 11 and abutting end surface 10 of the inner annular member C to the target finish dimensions by the grinding stone 25.

With the track surface 11 and abutting end surface 10 of the inner annular member C thus ground, it follows that the axial dimension of the inner annular member C has been set in connection with the diameter of the track surface 11, and the dimension of the track surface 11 based on the abutting end surface 10 is maintained constant.

The inner annular member C thus ground is then force-fitted on the step section (6) cylindrical surface of the outer joint member B until the abutting end surface 10 abuts against the step section shoulder surface 9 of the outer joint member B ground in the manner described above. In this condition, the axial distance between the centers of the two track surfaces 5 and 11 is always constant, which means that combinations of outer joint members B with inner annular members C at random are allowed and the influences of the outer peripheral track surfaces 5 and 11 on the bearing clearance in the assembled bearing can be eliminated.

Figure 4:
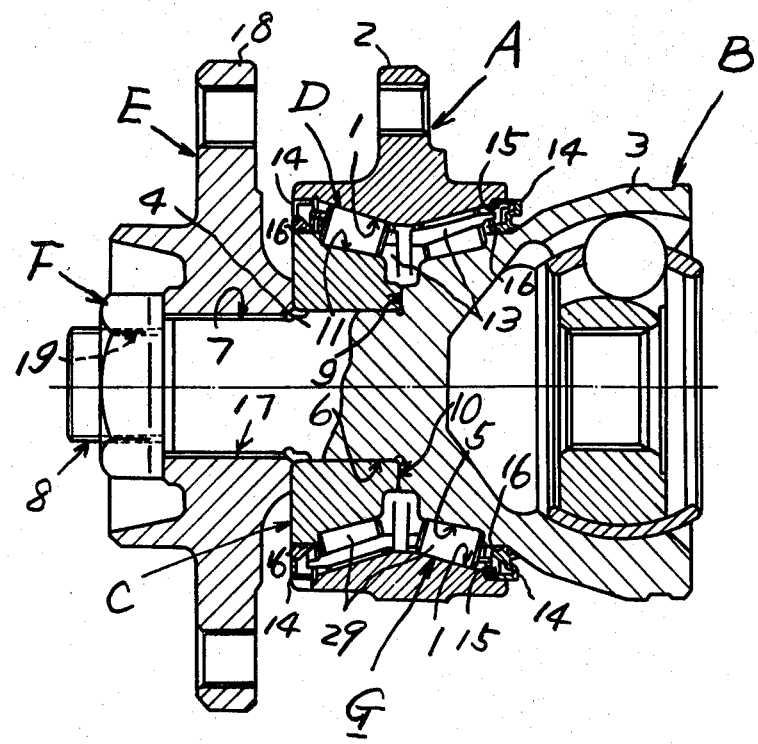
FIG. 4 is an explanatory view of another bearing device for the driving wheels of automobiles to which the production method of the invention is applied.
Figure 5:
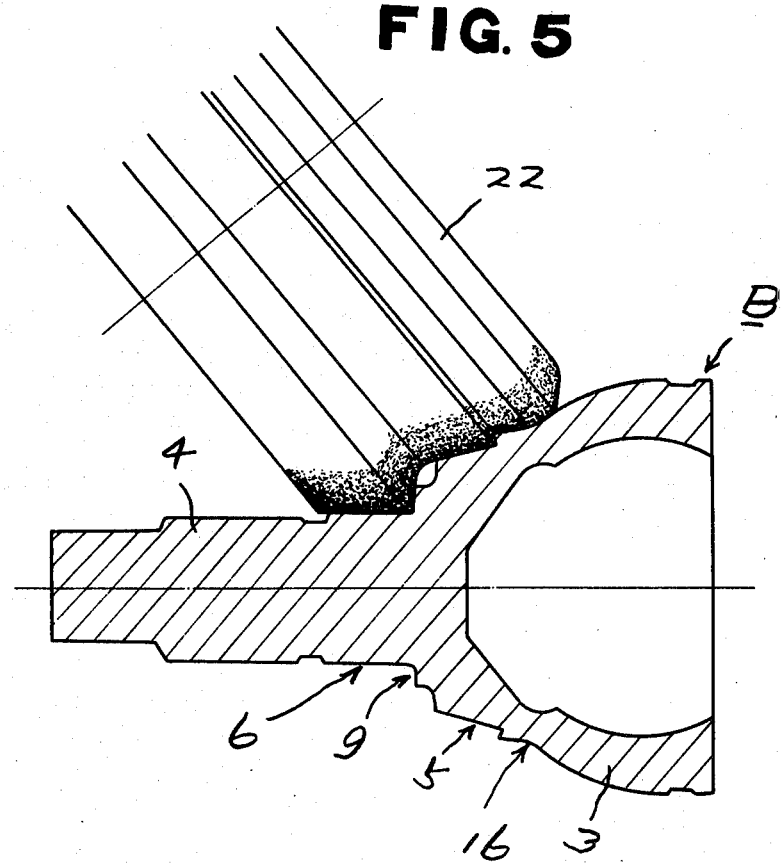
FIG. 5 is a digrammatic view illustrating the manner of grinding the outer joint member thereof.

While the above embodiment has been described with reference to a case where the bearing G is a double-row angular ball bearing using the rolling bodies D in the form of balls, the invention is applicable to the case of a double-row roller bearing using rollers 29 as the rolling bodies, as shown in FIG. 4. FIG. 5 is an explanatory view showing the manner of grinding the outer joint member of a bearing device for the driving wheels of automobiles using the bearing shown in FIG. 4.

Figure 6:
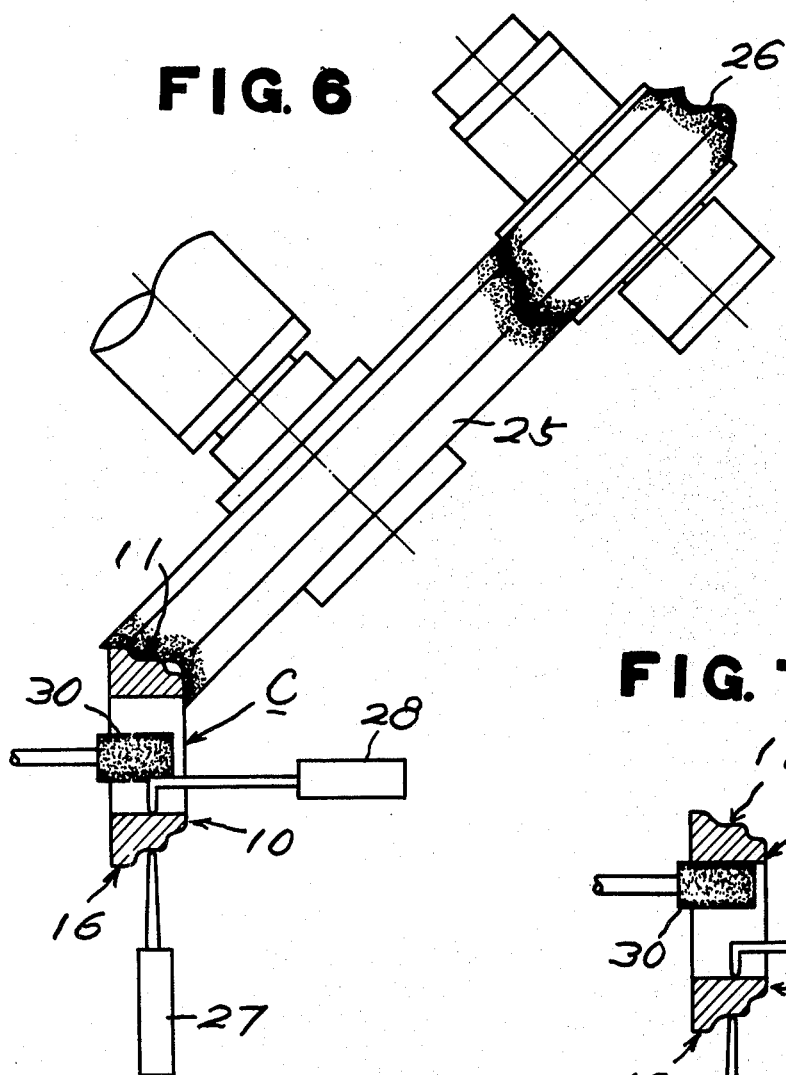
FIG. 6 is a diagrammatic view illustrating the manner of simultaneously grinding the outer peripheral track surface and bore of an inner annular member.

Further, while the above embodiment has been described with reference to a case where the bore of the inner annular member C is ground beforehand in grinding the outer peripheral track surface 11 and abutting end surface 10 of the inner annular member C, it is also possible to grind the bore by a grinding stone 30 simultaneously with the grinding of the outer peripheral track surface 11 and abutting end surface 10 of the inner annular member C, as shown in FIG. 6. In this case, the grinding of the bore of the inner annular member C is completed first, the finish dimension is measured by a gauge 28, and the data based on the result of the measurement is fed back to an on-gauge 27 to correct the target finish dimension of the track surface 11 of the inner annular member C.

Figure 7:
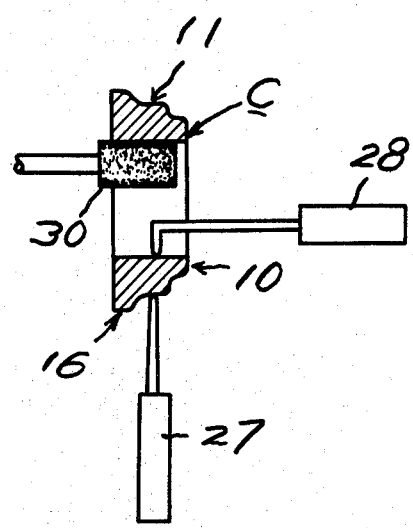
FIG. 7 is a diagrammatic view illustrating the manner of grinding the bore diameter of the inner annular member on the basis of the finish dimension of the outer peripheral track surface of the inner annular member.

FIG. 7 shows a case where after the grinding of the track surface 11 of the inner annular member C, the diameter of the track surface 11 is measured by the on-gauge 27 and the data based on the result of the measurement is fed back to the gauge 28 to correct the finish dimension of the bore of the inner annular member C.

In addition, the grinding stones 21 and 25 used for grinding the outer joint member B and inner annular member C each may be a one-piece grinding stone or a grinding stone assembly comprising a plurality of grinding stones coaxially put together on a single spindle.

As many apparently widely different embodiments of this invention may be made without departing from the spirit and scope thereof, it is to be understood that the invention is not limited to the specific embodiments thereof except as defined in the appended claims.

What is claimed is:

1. A method of manufacturing bearing assembly for the driven wheels of automobiles, which bearing assembly comprises an outer member having two rows of raceway surfaces formed on the inner periphery thereof, the outer joint member of a constant velocity joint having a raceway surface formed on the outer periphery thereof, an inner annular member having another raceway surface formed on the outer periphery thereof, and two rows of rolling elements interposed between the raceway surfaces of said outer member, outer joint member, and inner annular member, said outer joint member being formed with a cylindrical seat on which said inner annular member is fitted, with said inner annular member axially abutting against a shoulder surface formed at one end of the cylindrical seat, said method being characterized by the steps of of grinding at least said raceway surface of the outer joint member, said cylindrical seat surface, and said shoulder surface simultaneously by a grinding wheel, grinding at least said raceway surface of the inner annular member and its one end surface which abuts against the shoulder surface simultaneously by a grinding wheel, and fitting said inner annular member on the cylindrical seat of the outer joint member until it abuts against the shoulder surface.

2. A method of manufacturing bearing assembly for the driven wheels of automobiles as set forth in claim 1, characterized in that in simultaneously grinding the outer peripheral raceway surface and said end surface of the inner annular member by a grinding wheel, the raceway diameter to be finished of the inner annular member is determined on the basis of the result of the measurement of the bore diameter of the inner annular member by a gauge.

3. A method of manufacturing bearing assembly for the driven wheels of automobiles as set forth in claim 1, characterized in that in grinding the bore of the inner annular member by a grinding wheel, the diameter of the bore to be finished of the inner annular member is determined on the basis of the result of the measurement of the raceway diameter of the inner annular member by a gauge.

* * * * *